United States Patent [19]

Koslow

[11] 4,175,390
[45] Nov. 27, 1979

[54] SOLID STRESS MOTOR

[76] Inventor: George Koslow, 28 Warren St., New York, N.Y. 10007

[21] Appl. No.: 893,994

[22] Filed: Apr. 6, 1978

Related U.S. Application Data

[63] Continuation-in-part of Ser. No. 536,842, Dec. 27, 1974, abandoned.

[51] Int. Cl.² ............................................. F03G 7/06
[52] U.S. Cl. ..................................................... 60/527
[58] Field of Search ................. 60/516, 527, 528, 529, 60/721

[56] References Cited

U.S. PATENT DOCUMENTS

| | | | |
|---|---|---|---|
| 3,665,705 | 5/1972 | Christensen | 60/527 |
| 3,830,060 | 8/1974 | Jedlicka | 60/527 |

Primary Examiner—Allen M. Ostrager
Attorney, Agent, or Firm—Robert E. Burns; Emmanuel J. Lobato; Bruce L. Adams

[57] ABSTRACT

A motor comprises a rotor supported to rotate freely about its longitudinal axis while the axis is confined to an elastically bowed configuration by internal or external means. Heat, cold or other stress inducing means applied to the side of the rotor causes local internal stresses that cause the rotor to rotate in the direction that allows relaxation of the induced stress.

14 Claims, 9 Drawing Figures

U.S. Patent
Nov. 27, 1979
4,175,390
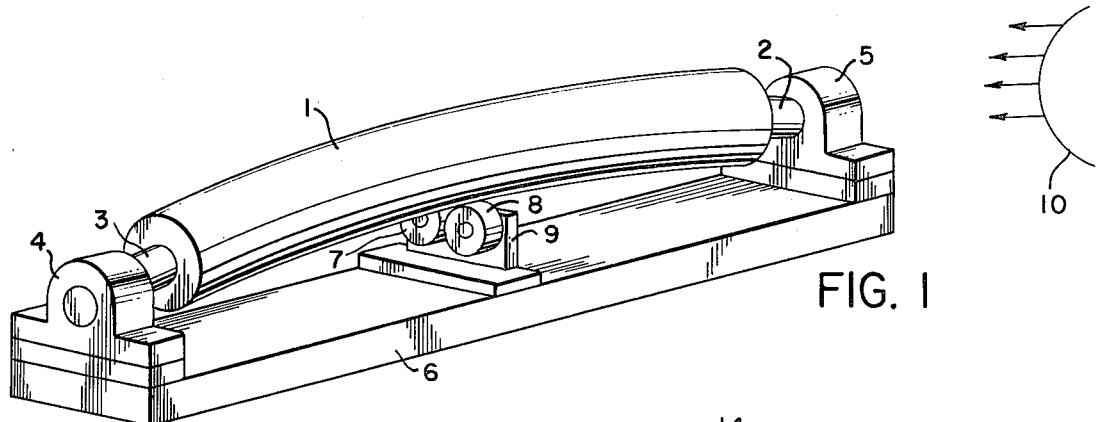
FIG. 1
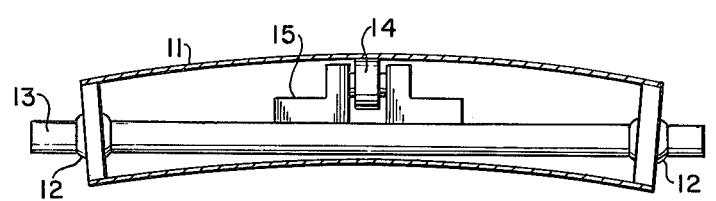
FIG. 2
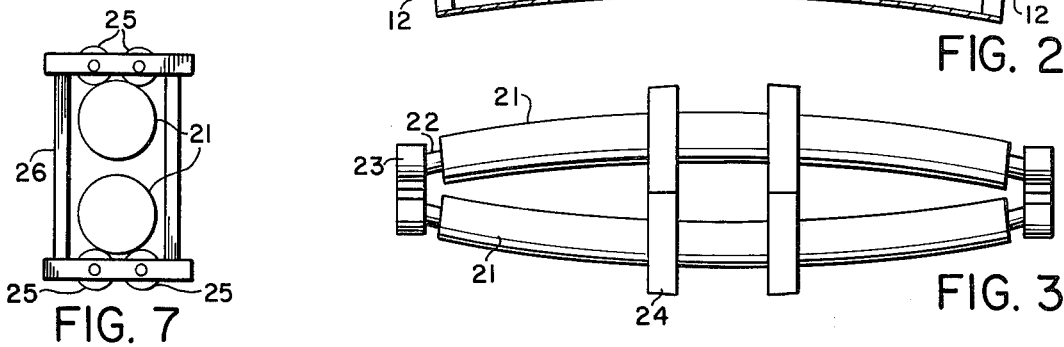
FIG. 7
FIG. 3
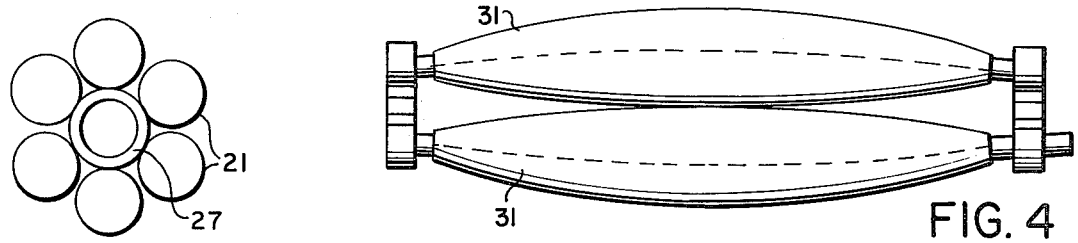
FIG. 8
FIG. 4
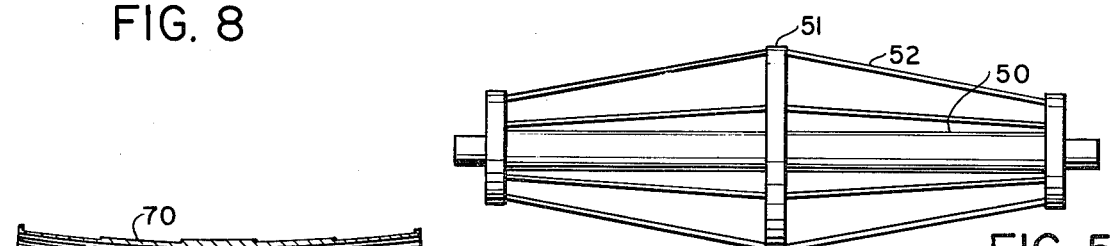
FIG. 5
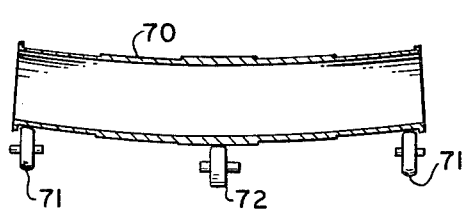
FIG. 9
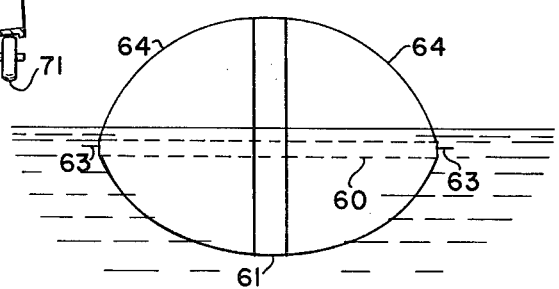
FIG. 6

SOLID STRESS MOTOR

REFERENCE TO PRIOR APPLICATION

This application is a continuation-in-part of application Ser. No. 536,842 filed Dec. 27, 1974, now abandoned.

BACKGROUND OF THE INVENTION

The invention generally relates to thermal motors using a solid material to convert thermal energy or other stress inducing sources, directly into mechanical energy. Thermal engines employing expansion of solids have been proposed in the past. For example, Jedlicka, et al U.S. Pat. No. 3,830,060 describes an engine comprising a rotor which is stressed by forces such as gravity or springs, applied near the ends of the rotor and tending to bend it and means for applying heat to the compression side of the rotor, the forces applied to the rotor are compliant so as to allow expansion of the heated side of the rotor.

An article entitled A Rubber Heat Engine by Paul B. Archibald which appeared in the March 1967 issue of Research/Development describes a heat engine using the principle that the retractive force of rubber is proportional to the absolute temperature. The Archibald engine clearly illustrates how induced stress alone produces torque. However, the Archibald engine is limited as to the materials that can be used and requires a heavy frame and thrust bearings with high bearing loads.

SUMMARY OF THE INVENTION

A principal object of the present invention is to provide a thermal motor which is simpler, more efficient and capable of utilizing a wide range of unlikely materials, and sources of energy other than heat.

The stress motors of the present invention advance the art taught by Archibald by providing designs that permit use of a vast variety of materials as well as other stress inducing means. These designs also eliminate the need for heavy frames and thrust bearings, and reduce bearing loads. A simple embodiment of the present invention employs a single rotor supported to rotate about its longitudinal axis while said axis is confined to an elastically bowed configuration by one or more external rollers. Heat or other stress inducing means, applied to the compression side of the rotor induces local stresses that cause the rotor to rotate in the direction that allows relaxation of the induced stresses. A preferred embodiment employs two or more rotors with each rotor serving as the bowing means for the other.

BRIEF DESCRIPTION OF DRAWINGS

FIG. 1 is a simplified perspective of a motor with one rotor bowed by two external rollers, FIG. 2 is a simplified sectional view of rotor bowed by an internal roller, FIGS. 3 and 4 illustrate motors with two mutually bowed rotors, FIG. 5 illustrates a rotor constructed of elements held in tension, FIG. 6 illustrates a buoyant rotor bowed by an internal weight, FIG. 7 is a simplified section of the center of a motor with two rotors bowed toward one another, FIG. 8 is a simplified section of a motor with 6 rotors bowed apart over a short tubular member, and FIG. 9 is a simplified section of a hollow sun powered motor.

DESCRIPTION OF PREFERRED EMBODIMENTS

As used in the following description, the term fluid includes liquids, gasses and fluid containing cellular materials. The term bowing as used herein includes bending and any displacement of the axis of rotation of any end of the active material that produces an elastic difference in length around that axis. The term polymer or polymeric as used herein includes natural rubber, synthetic rubber and other polymers, and similar materials that when stretched, tend to develop increased tensile stress when subject to increased temperature.

Referring to the drawings, a simplified embodiment of a stress motor in accordance with the invention is shown in FIG. 1. A straight cylindrical rotor comprising a thin walled tube 1 which has coaxial shafts 2 and 3 fixed to opposite ends and mounted for rotation in a pair of pillow blocks 4 and 5. Pillow blocks 4 and 5 are widely available commercial types incorporating self aligning bearings, and mounted on a base 6. Rollers 7 and 8 are journaled on shafts supported by a bracket 9 engage a central portion of the tube to deflect it laterally of the axis defined by the bearings 4 and 5. Bracket 9 is mounted on base 6 and positioned under rotor 1 so as to confine the axis of rotor 1 to an elastically bowed or bent configuration without restricting rotation of rotor 1. 10 represents a source or radiation such as the sun. When heat or cold is applied to the neutral side of the rotor, it will induce stresses that try to expand or contract that portion, causing the rotor to rotate in the direction that allows relaxation of the induced stress. A single roller such as 7, can be used to bow the rotor, however, the use of additional rollers helps to better distribute the loads. The bowing or bending produces an elastic increase in longitudinal fiber length on the convex side and a decrease in fiber length on the concave side. The result is a length gradient from one side to the other. Stresses cause by bowing, bending, or the equivalent, or by precompressing or pretensioning the active rotor material, are balanced and do not produce torque. However, if the stress is changed in some longitudinal fibers on one side, by thermal or other means, these fibers will add to or subtract from the balanced longitudinal force they were exerting. Because of the available length gradient produced by bowing, the resultant unbalanced force will cause rotation in the direction that allows the fiber length to make the change that relaxes the induced stress. The longitudinal fibers behave much like the parallel pistons in hydraulic motors that produce rotation by exerting force against a wobble plate. The tilt of the wobble plate provides a piston stroke length gradient comparable to that produced in longitudinal fibers by bowing. The kinship is most apparent with the rotor of FIG. 5. Within the elastic limit of the material, and with allowance for induced stress, an increase in the magnitude of the length gradient will increase efficiency.

FIG. 2 is a longitudinal sectional schematic view of a motor, simplified for clarity, showing a hollow rotor 11 rotatably mounted by self-aligning bearings 12 on a relatively rigid non-rotating shaft 13 and bowed by an internal roller 14 mounted on the non-rotating shaft 13 by a bracket 15. An internal bowing means can itself be another active rotor. The inner rotor can even be concentric with and joined to, the outer rotor at the center.

FIG. 3 illustrates schematically a motor comprising two rotors 21 each having stub shafts 22 at opposite ends rotatably supported by self-aligning bearings 23. In their central portions the rotors 21 have one or more enlarged rings 24 which engage corresponding rings on the other rotor to bow the rotors outwardly from one another as seen in FIG. 3. Such rotors need not be symmetrical in any way, parallel or equally spaced, or even in the same plane. This type of motor can be constructed so it can float directly on and be cooled by water while the upper side is heated by solar radiation. Or, it can be constructed to operate on the difference between air and water temperature, or between surface and sub-surface liquid temperature. Twin rotor motors can be bowed toward one another instead of away from one another, by means of an external ring, or by means such as shown in FIG. 7. Thus as in FIGS. 1-3 rotors rotate about bowed axes.

FIG. 4 illustrates a motor comprising twin rotors 31 that have been tapered in diameter so as to better distribute the stresses, and permit a greater degree of bowing. This can also be accomplished by tapering the wall thickness of tubular rotors as shown in FIG. 9. The dotted lines shown in FIG. 4 help to show how the axis has been bowed. Because they are in rolling contact, these rotor pairs must rotate in opposite directions. An intermediate roller can be used if like rotation is required.

FIG. 5 illustrates a simplified embodiment of a rotor constructed of elements held in tension by an axial shaft member. This is a rotor not a motor, and can be used in place of the rotors in the motors of FIGS. 1-4. This embodiment permits the use of materials having low compressive strength and high tensile strength. The elements 52 can be rods, wires, straps, filaments, polymer bands, and etc. The transverse spreader 51 can be a ring widely clear of the shaft 50 or one that is closely fitted or attached to the shaft. When the spreader 51 is attached to the shaft 50, the shaft will bend during bowing. If the shaft is made of suitable material and construction, it too can absorb induced stress and contribute torque. On the other hand when an open ring is used for the spreader, the spreader ring will be displaced radially toward the shaft when the rotor is bowed, thus producing a bend in the axis of rotation of the tensioned elements, with negligible bending of the shaft. When polymer materials are used for elements 52, and held in tension, they will develop increased tensile stress when heated and will rotate in the opposite direction from a rotor made of metal. The longitudinal elements 52 can be full length and unjoined or fastened to ring 51, or they can be interrupted at and joined to ring 51. FIG. 5 also illustrates a simplified embodiment of a rotor constructed of elements held in compression by an axial member. This permits the use of materials having low tensile strength and high compressive strength. The combined elements 52 can be constructed as one hollow shell, particularly where the circumferential conductivity is low.

FIG. 6 illustrates a simplified embodiment of a motor comprising a rotor suspended for rotation in a liquid by buoyancy, and bowed by internal weight. This bowing can also be produced by external means that do not restrict rotation. Similarly, a lighter-than-air motor can be constructed to be rotated by solar energy, and bowed by internal or external means. The rotor shown in FIG. 6 is bowed for thermal operation in warm water and cold air, without sunlight, or for operation with a hygroscopic rotor. Longitudinal member 60, shown in dotted outline, is concentrically attached at its opposite ends to the shell 64, and can be employed to add weight, or to longitudinally pre-stress the active shell 64 of the rotor. Part 61 is an optional ring, disc or spacer and can be mounted internally, flush, or externally projecting, to add rigidity, weight, or to serve as a spreader or joint. When used as a weight, part 61 would reverse the bow shown so as to make the longitudinal fiber length shortest at the top. Lines 63 show the position of the axis of rotation of the motor. As illustrated, liquid pressure causes a decrease in longitudinal fiber length on the bottom of the rotor, and an increase in fiber length on the top. The rotor as illustrated resembles a football; however it can be spherical, cylindrical, conical, and various combinations and variations of these shapes.

FIG. 7 illustrates schematically a modification of the motor shown in FIG. 3. Instead of the rotors 21 being bowed outwardly, they are bowed inwardly toward one another by means of rollers 25 in a frame 26.

FIG. 8 illustrates a further modification of the motor of FIG. 3 and shows in simplified transverse section how a cluster of six rotors 21 can be bowed outwardly by a short centrally positioned member 27. This motor will operate on heat radiated or conducted from the passage of heated gas along the axis of the cluster. If instead the six rotors are bowed inwardly by an external ring, then it would respond to a cool gas fed through the center of the cluster of rotors or through a tube positioned in the center of the cluster. The motor of FIG. 8 is not self-starting as shown. However, deflectors can be added to unbalance the radiant or conducted heat or other stress inducing means, to make this embodiment self-starting.

FIG. 9 is a longitudinal section in simplified schematic form, of a sun powered hollow motor that, with attached or internally positioned guiding or deflection means, can be used for tumbling, drying, or conveying. The hollow tubular rotor 70 is supported for rotation by rollers 71 at each end. Rollers 72 or other means, positioned under the center, limit the bow and prevent the motor rotor 70 from sagging beyond its elastic limit. Tapering the wall thickness of the hollow rotor as shown helps to better distribute the stresses and allow a greater degree of bowing. Raising the center roller 72 to reverse the bow, will permit this motor to operate on other sources of thermal energy when solar energy is unavailable. Waste heat or cold from a conveyed product can also be employed.

As shown in the drawings, and probably most clearly by FIG. 5, it is not necessary for the rotors to have the freedom to expand or contract as taught in the earlier art. The equivalent stress, one that tries to produce expansion or contraction, and one that would produce expansion or contraction if not confined, induced by any phenomena, can be employed to operate solid stress motors of the present invention. If a motor rotor is made of a suitable alloy stresses can be induced by magnetic-striction. Nickel and nickel alloys, among other materials, exhibit a change in dimension, or force if confined, under the influence of a strong magnetic field. Brittle materials or those with high compressive strength and low tensile strength can be used for the rotor by incorporating means for maintaining the working material in compression. A rotor incorporating piezoelectric materials can be stressed by electrical means. A rotor including fissionable material and shielding can produce its own heat where it passes other fissionable material, or comes close to a rotor. A piezoelectric motor can be constructed so that it is driven by thermal energy while it simultaneously functions as a piezoelectric generator. Similarly, a suitably magnetized rotor can be driven by thermal energy while also generating electricity. Motor rotors can also be made of materials or elements incorporating confined or interspersed liquids or gasses. Motor rotors can also be made of materials that try to change dimension or develop the equivalent internal stress when and as they absorb or adsorb or release, liquids, gasses, molecules, atoms, ions or sub-atomic particles or radiation. For example a motor incorporating rotors made or wood, cotton cord, celluslose strips, or other hygroscopic material, can be operated by the absorption and release of water or moisture. The rotor is positioned so that some of the active elements are immersed in or exposed to water or other suitable material. The resultant forces caused by the attempt to swell, causes rotation of the rotor and moves the activated elements to a dry area where they can release the absorbed water or other substance, and recover their original degree of stress. A cellular or porous material saturated with water or other substance, can employ the phenomenon of dimentional change that occurs during change of state, such as the expansion of ice crystals to produce the stress that would operate a motor construction with this material. Solid stress motors of this invention can be made of almost any material. Some materials such as stretched rubber and other polymers, develop increased tensile stress when heated. This causes rotation toward the short fiber-length side of a rotor. Materials that develop increased compressive stress when heated, will rotate toward the long fiber-length side of a rotor. Masks, shields, reflectors, refractors, insulation, coatings, radiators, anti-radiators, and etc. can be employed to direct and control the induction of stress. Low friction bearings such as rolling element bearings, fluid bearings, magnetic bearings, and etc. are preferred.

Heat can be added to or removed from the rotors by radiation, convection, conduction, electro-magnetic induction, RF, microwaves, evaporation, condensation, combustion, nuclear fission, chemical action, electrical conduction through commutators or slip-rings, ultrasonic vibration dielectric heating and any other means.

The term motor as used herein applies to stress motors of the present invention, and includes those constructed for partial rotation, cyclically reversing rotation, continuous rotation, for rotor stationary operation, and for any variation thereof. It includes motors made of any material or combination of materials, including combinations with fluids, and materials that have been treated or coated to improve absorption and release of radiant energy or other stress inducers. It includes motors having rotors that are fluted, finned, ribbed, spiked, grooved or embossed, as well as non-symmetrical rotors and rotors of other geometric shapes. It includes motors operable by any phenomena that causes stress changes. It includes motors having rolling rotors without convenional journals, and also orbiting rotors. It includes motors having rotors supported elastically, for partial rotation, in place of conventional journals. It includes motors having one or more rotors rotating in the same or opposite directions. It includes motors integrated with the apparatus they are driving.

Whereas the above description has been limited to a few simplified embodiments it is to be understood that these embodiments are greatly simplified and offered for purposes of illustration only. From the above disclosure, one of ordinary skill in the art will envision many other alterations, modifications and further embodiments of the invention. It is therefore to be understood that the above disclosure is not to be taken as limiting and that the appended claims are to be interpreted as covering all such alterations and modifications as fall within the true spirit and scope of the invention.

What is claimed is:

1. A solid stress motor comprising at least one rotor having a central portion of circular cross sectional shape, means for supporting said rotor for free rotation about an axis, and deflecting means engaging a circular central portion of said rotor for elastically deflecting said central portion of said rotor laterally of said axis and thereby rendering a portion of said rotor stress-responsive, whereby rotation of said rotor is induced by application of stress-change producing media to said stress-responsive portion of said rotor.

2. A motor according to claim 1, wherein said rotor includes means for pre-compressing said stress responsive portion of said rotor.

3. A motor according to claim 1, wherein said rotor includes means for pre-tensioning said stress responsive portion of said rotor.

4. A motor according to claim 1, wherein said deflecting means is internal of said rotor.

5. A motor according to claim 1, wherein said deflecting means is external of said rotor.

6. A motor according to claim 5, comprising a plurality of said rotors which are elongate and are rotatably supported at their ends, said deflecting means comprising means for deflecting central portions of said rotor toward one another.

7. A motor according to claim 5, comprising a plurality of rotors which are elongate and are rotatably supported at their ends, said deflecting means comprising means for deflecting central portions of said rotors away from one another.

8. A motor according to claim 5, comprising two rotors journaled for rotation about their axes and positioned so both said axes are confined to elastically deflected configurations by rotatably cooperating surfaces on said rotors.

9. A motor according to claim 1, wherein said rotor comprises an axial means having spaced supporting means fixed thereon, a plurality of elements disposed around said axial means and secured at their ends to said spaced supporting means, and spacer means engaging said elements intermediate their ends.

10. A motor according to claim 9, wherein said axial means acts through said supporting means to prestress said elements.

11. A motor according to claim 1, wherein said rotor is a buoyant body suitable for suspension in a fluid for rotation.

12. A motor according to claim 11, wherein said deflecting means comprises means for applying a load near the center axially of said rotor.

13. A motor according to claim 12 wherein said load applying means comprises a concentric weight.

14. A motor according to claim 11, wherein said deflecting means comprises said fluid.

* * * * *